United States Patent Office 3,405,092
Patented Oct. 8, 1968

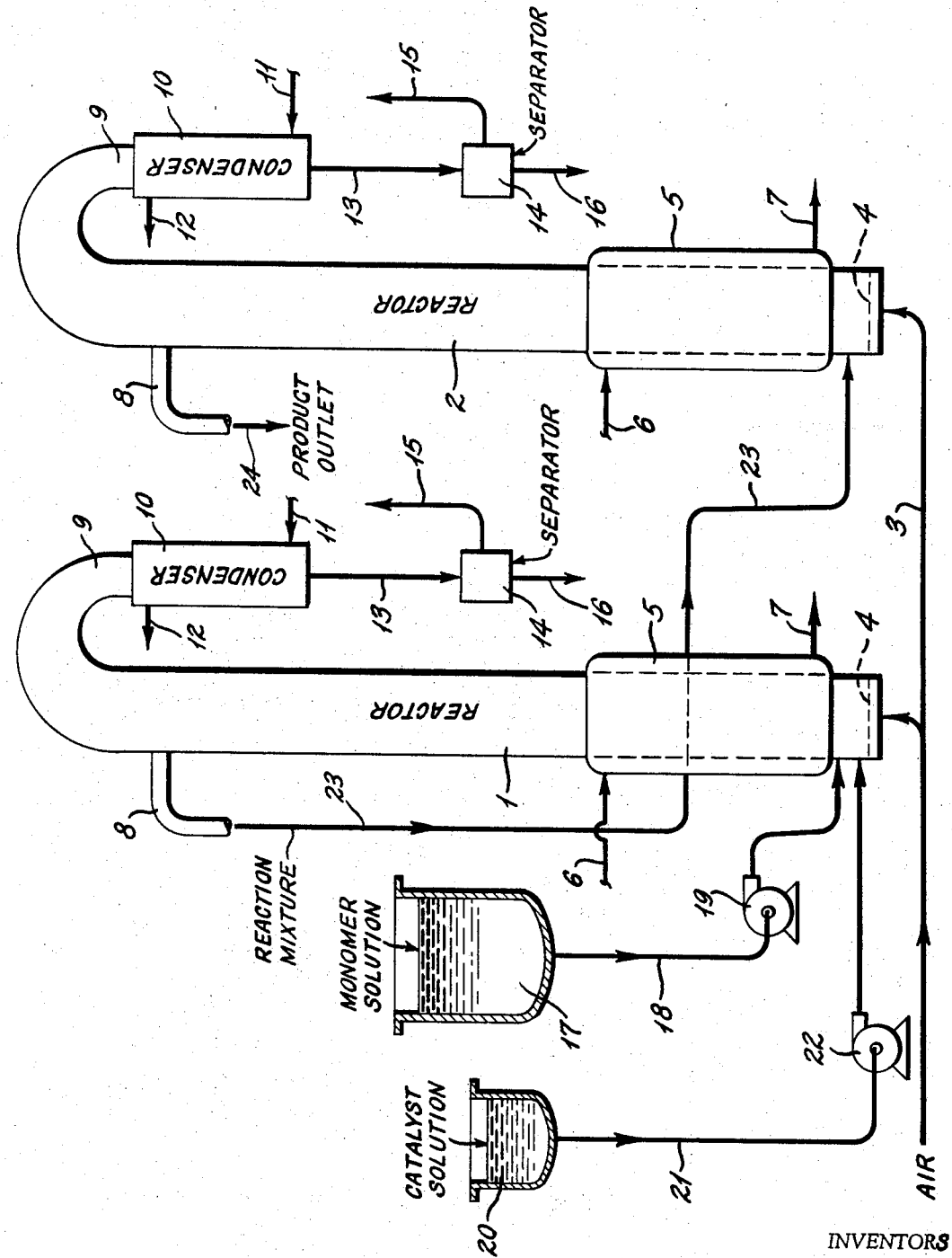

3,405,092
METHOD FOR THE OXIDATIVE POLYMERIZATION OF PHENOLS
Jan A. Meijs, Arnhem, and Franciscus I. M. van Haaren, Velp, Gelderland, Netherlands, assignors to N.V. Onderzoekingsinstituut Research, Arnhem, Netherlands, a corporation of the Netherlands
Filed Oct. 15, 1965, Ser. No. 496,446
Claims priority, application Netherlands, Oct. 29, 1964, 6412572
4 Claims. (Cl. 260—47)

ABSTRACT OF THE DISCLOSURE

Phenols are oxidatively polymerized by passing a stream of an oxygen-containing gas (e.g., air) through a solution of the phenol containing an oxidation catalyst (e.g., cuprous chloride) at a superficial velocity of at least about 0.15 meter per second. The process may be continuous or discontinuous, and may be carried out in one or more vertical tubular reactors.

---

This invention relates to a method for the oxidative polymerization of phenols by passing an oxygen-containing gas through a solution of the phenol to be polymerized, said solution also containing an oxidation catalyst. Said solution will hereinafter be referred to for brevity as "reaction mixture."

Such a process broadly is known inter alia from British Patent No. 930,993, which mentions that phenols, substituted or not, may be polymerized by means of oxygen and with the aid of catalysts.

By polymerization is to be understood here the formation of oxidation products which are composed of at least two molecules of the original phenol. The British Patent No. 930,993 mentions that, depending on the reaction conditions, high molecular weight polyarylene ethers or diphenoquinones are obtained.

Although the present invention also includes the preparation of diphenoquinones, it relates more particularly to the preparation of high molecular weight polyarylene ethers, which, as is mentioned in the British Patent No. 930,993, find wide application as a plastics.

The British Patent No. 930,993 mentions a number of methods for the preparation of high molecular weight polyarylene ethers, such as poly(2,6-dimethylphenylene oxide). It is true that these methods may be used for the preparation of such products on a laboratory scale, but they cannot very well be used on an industrial scale.

The present invention therefore has for its object to provide a method which is very suitable for carrying out the above-mentioned process on an industrial scale. This invention makes it possible not only to convert large amounts of starting material with the aid of simple equipment and in a short time, but also to form products the purity of which is higher than that of the products obtained by any one of the previously known methods.

The method according to the present invention is characterized in that the reaction of the above-described type is carried out by introducing into a vertical column of the reaction mixture, at the bottom thereof, a stream of the oxygen-containing gas the superficial velocity (i.e., the average linear speed, calculated on the cross-sectional area of the column) of which is at least 0.15 meter/second. The best results are obtained if said velocity is within the range 0.4 and 0.8 meter/second, and the use of a velocity within this range is therefore to be preferred.

The method according to the present invention may be carried in a vertical tubular reactor which is only partially filled with the gas-free reaction mixture. Upon passing through the gas, a vigorously turbulent gas-liquid mixture is formed. The volumn of said gas-liquid mixture is on the one hand dependent on the rate at which the gas is passed through and the properties of the liquid, and on the other hand on the space available for the mixture in the reactor. If at some level there is provided a liquid-overflow, then the mixture will obviously not rise higher than this overflow.

In general, a reactor will be chosen such that the volume which is available for the gas-liquid mixture is about three times that of the gas-free reaction mixture present in the reactor. However, if desired said volumes may also be chosen in proportions different from this ratio without departing from the spirit of the invention.

Since with the method according to the present invention and contact between the gas and the reaction mixture is very intimate, the time required to reach a given degree of conversion is far shorter than with the previously known methods. For carrying out the process on an industrial scale this is obviously of great importance. Since with the method according to the present invention the reaction speed is considerably higher than with the previously known methods, the amount of catalyst used may be smaller, which must, of course, for various reasons be considered an advantage. A further advantage of the method according to the present invention is that the water formed in the reaction is thoroughly and completely removed, so that to this end no special provisions are required.

Preferably, the method according to the present invention is carried out continuously in that liquid is continuously fed to and withdrawn from the column.

An advantage of this continuous method over discontinuous methods is that the rate at which water is formed in the reaction mixture is constant. With discontinuous methods the amounts of water formed at the beginning of the reaction are considerably greater than those formed at the end of the reaction. These greater amounts of water formed at the beginning of the reaction can not usually be removed sufficiently quickly, so that it becomes possible for the water to deactivate the catalyst. With the continuous method, on the other hand, the water is formed at a constant rate and the oxygen-containing gas which is passed through the reaction mixture immediately carries off the water formed. As a result, with the continuous method according to the present invention the catalyst may be used in an even smaller amount than with the discontinuous method.

A very important advantage of the method according to the present invention is that polymers are obtained which, after they have been separated from the reaction mixture in the usual manner, contain considerably smaller amounts of impurities than the polymers prepared in the previously known way. As will be shown in the examples below, it is possible according to the present invention to obtain polymers of which the nitrogen content is two to three times as low and the chlorine content three to four times as low as in the case of the polymers obtained by any one of the previously known methods.

This surprising phenomenon, which is of major technical and economic importance, cannot as yet be explained.

As the oxygen-containing gas use may be made of any conveniently available gas, as long as it contains oxygen. In practice it will always be preferred, for reasons of economy, to use air, which, if necessary or desired, may be dried and freed from carbon dioxide before it is introduced into the reaction mixture.

As mentioned above, the superficial velocity of the oxygen-containing gas should be at least 0.15 meter/second. When this velocity is lower, then the residence time of the reaction mixture in the vertical column must be made considerably higher, and products are then obtained which contain greater amounts of impurities than the products obtained by the method according to the present invention.

The rate at which the gas is passed through the reaction mixture cannot as a practical matter be increased indefinitely, since at some such increased rate the reaction mixture would be blown out of the apparatus. In general, very favorable results are obtained at rates within the range of about 0.4 to 0.8 meter/second.

With the continuous method the supply of fresh reaction mixture to the column, just as the removal of liquid from it, may take place at any point. Of course, these points will not be chosen very near to each other. For instance, the liquid may be fed to the reactor at the top thereof and discharged at the bottom.

In practice, however, the method of the present invention is advantageously carried out in such manner that the supply of fresh reaction mixture to the liquid column takes place at the bottom thereof, and the discharge of liquid at the top. Both the fresh reaction mixture and the oxygen-containing gas are then fed to a tubular reactor at the bottom thereof. In the reactor the reaction mixture and the gas form a highly turbulent dispersion, which leaves the reactor at the top thereof by way of a suitable discharge conduit.

The rate at which the fresh reaction mixture is fed to the column may vary. The degree of conversion, which manifests itself in the amount of oxygen absorbed by the reaction mixture, is governed by the average residence time of the reaction mixture in the column, if the other reaction conditions such as temperature, nature and amount of the catalyst, et cetera, are kept constant.

If it is desired to complete the reaction in the column, then said residence time will be made longer than if the conversion need only be partial. In general, it is to be preferred that the reaction takes place in a plurality of reactors through which the reaction mixture passes successively. It is then possible to choose in each of the various reactors the optimum conditions (temperature, amount of air blown through, et cetera) for the particular reaction mixture contained therein. In general, the method is advantageously carried out in such manner that at least 60% of the oxygen required for the polymerization is absorbed in the first reactor. The second and, if any, the following reactors may be of the same type as the first, but this is not necessary. Since the absorption of the last portion of oxygen requires considerably more than than the absorption of an equal amount of oxygen at the beginning of the reaction, it is preferred that the absorption of the last portion of the oxygen required for the reaction should take place in a residence time reactor in which little or no additional oxygen is passed into the reaction mixture. By a "residence time reactor" is to be understood here a vessel in which the oxygen dissolved in the reaction medium in the preceding reactors is allowed to complete the reaction. Such a reactor need only comprise an enclosed space through which the reaction mixture passes and in which it remains for some time. This reactor may either be of the ideal mixer or of the piston flow reactor type. The latter type of reactor is generally to be preferred.

With the method according to the present invention the other reaction conditions, such as temperature, composition of the reaction mixture, et cetera, may vary widely. The composition of the reaction mixture from which the process is started may vary widely. The monomer in the mixture may be any one of monomers mentioned in British Patent No. 930,993, but it is also possible to use other monomers. The catalyst system may be one of the systems described in the aforesaid British patent, but it is also possible to use other catalyst systems, for instance, those described in French Patent Nos. 1,325,480 and 1,379,278; Belgian Patent No. 639,078; British Patent No. 982,471; and U.S. patent applications Ser. Nos. 372,375 and 439,449, now Patent Nos. 3,337,499 and 3,337,501, respectively. Also the solvents may vary widely, and use may be made of any of the solvents mentioned in the foregoing patents and patent applications.

By way of example, an embodiment of the apparatus in which the process according to the present invention may be carried out is schematically shown in the accompanying figure.

In this figure the reference numerals 1 and 2 refer to two vertical tubular reactors arranged in series. Each reactor is connected at its bottom with a feed conduit 3 for compressed air, which air may enter the reactor by way of the usual measuring equipment (not shown) and is then distributed by means of a perforated plate 4. The reactor is provided with a jacket 5 which is equipped with an inlet 6 and an outlet 7 for heating or cooling liquid. There are further provided a discharge 8 for the reaction mixture and an outlet 9 for the air.

The outlet 9 communicates with a condenser 10, which is provided with a feed conduit 11 and a discharge conduit 12 for cooling liquid.

The condenser is also connected with a conduit 13 for the discharge of air and condenser vapors, which may be separated from each other in the separator 14, which is connected with the conduit 13. The separator 14 is connected with a gas discharge conduit 15 and a liquid discharge conduit 16, through which the vapors condensed in the condenser 10 may be discharged.

The monomer solution is stored in a storage vessel 17, which is connected with the reactor 1 via conduit 18 and metering pump 19.

The catalyst solution is stored in a storage vessel 20, which is connected with the reactor 1 via conduit 21 and metering pump 22. The reactor 1 is connected via conduit 23 with the base of the reactor 2. The reactor 2 connects with a conduit 24 for the discharge of the reaction mixture.

When the above-described apparatus is in operation, streams of the monomer solution, of the catalyst solution, and of air are continuously forced into the reactor 1 through the conduits 18, 21 and 3, respectively. The mixture of these materials forms a highly turbulent reaction mass, from which liquid is continuously withdrawn by way of the discharge 8, from which liquid is fed to the reactor 2 via conduit 23. The air escapes by way of the outlet 9 and is freed from the entrained solvent in the condenser and the separator 14, after which the condensed solvent is discharged via the liquid discharge conduit 16 and purified, if necessary or desired, after which it is re-used.

The reaction mixture fed to the second reactor 2 undergoes in this second reactor a treatment which is similar to that undergone in the first reactor. The reaction mixture leaves the second reactor via conduit 24. Depending on the degree of conversion attained, the reaction mixture is then worked up to the final product or is fed to still further reactors, which may be of the same type as the reactors 1 and 2, or of a different type.

It will be obvious that the process according to the present invention may also be carried out in apparatus which is different from that shown in the figure. For instance, in the column sieve plates may be provided at various levels to prevent the formation of very large gas bubbles, which bubbles might make the process less effective.

Furthermore, the monomer solution may be fed to the reacted in combination with the catalyst. Moreover, the air which escapes from the last reactor may be recycled to one of the preceding reactors. This air, being saturated with solvent, will counteract the evaporation of solvent in the preceding reactors. Of course, the water content of the recycled air must not be so high as to exert an unfavorable influence on the reaction.

In some cases it may be preferred not to introduce all of the monomer to the first reactor, but rather to feed part of it to a second or following reactor; for it has been found that the speed at which the oxygen is absorbed may be dependent on the concentration of phenolic hydroxyl groups, i.e., that this speed is highest at a particular, relatively low concentration of these groups. Hence, by introducing all of the monomer to the first reactor this optimum concentration is exceeded and so the highest possible reaction speed may not be reached.

Also the catalyst may be fed partially to the first reactor and partially to the following reactors. Furthermore, in some cases it may be preferred to feed to the following reactors a type of catalyst which is different from that fed to the first reactor, because some catalysts are very suitable for the continued oxidative polymerization of low molecular weight polymers, but if they are brought into contact with the monomer they promote the formation of undesirable by-products.

The concentration of the reacting components may be controlled by regulating the amount of evaporation and/or recycled solvent in a particular reactor.

If it is desired to keep the amount of evaporating solvent low, then use may be made of a solvent having a relatively high boiling point, such as mixtures of diphenyl and diphenyloxide, etc.

Recovering the solvent from the air need not, of course, take place separately at each reactor, but may be carried out by means of a central recovery apparatus.

The preparation of polymers by the method according to the present invention will be still further elucidated by means of the following examples.

EXAMPLE I

The reaction is carried out in a system as shown in the accompanying figure, the tubular reactors being 10 cm. in diameter and 3.75 m. in height.

The storage vessel 17 is filled with a solution of 110 g. 2,6-dimethylphenol per kg. dry toluene.

The storage vessel 20 is filled with a solution in 5.25 kg. dry toluene of 43 g. cuprous chloride and 366 g. dimethyllaurylamine.

The monomer solution is fed to the reactor 1 at a rate of 0.73 kg./min. and the catalyst solution at a rate of 0.09 kg./min. The feed rate of the air is 18 m.$^3$/hour, corresponding to a superficial velocity of about 0.64 m./sec. The temperature in the reactor is kept at 40° C.

The average residence time of the reaction mixture in the reactor 1 is 10 minutes. When the reaction mixture leaves the reactor 1, 60% of the amount of oxygen theoretically required for the polymerization has been absorbed.

The rate at which air is fed to the second reactor is 18 m.$^3$/hour, corresponding to a superficial velocity of about 0.64 m./sec. The residence time in this reactor is 10 minutes. When the mixture leaves the second reactor, the degree of conversion is 81%.

The reaction mixture is then kept in a residence time reactor at 40° C. for 20 minutes, only a very small amount of air being passed through.

The polymer thus obtained has a relative viscosity of 1.79 measured in a 1% solution in benzene. The chlorine content of the polymer is 0.04% by weight and the nitrogen content is 0.05% by weight.

If the same mixture of monomer and catalyst is brought into contact with air in the conventional manner in a reactor provided with a stirrer, then the time required for reaching the same degree of conversion is 150 minutes. The polymer obtained after it has been worked up in the same manner has a relative viscosity of 1.80, a chlorine content of 0.13% by weight, and a nitrogen content of 0.11% by weight.

EXAMPLE II

A number of polymerization reactions of 2,6-dimethyl phenol are carried out in the same way as described in Example I, the reaction conditions being varied. The reaction conditions and the properties of the polymers obtained are shown in the following Table I:

TABLE I

| Run | Monomer (in toluene) | | Catalyst: CuCl and dimethyl-laurylamine in toluene | | | Average residence time in reactor(s) | Degree of conversion | Polymer | | |
|---|---|---|---|---|---|---|---|---|---|---|
| | Conc., kg./kg. | Feed rate, kg./minute | Molar ratio, CuCl/DMLA | Conc. CuCl/, kg./kg. | Feed rate, kg./minute | | | Relative viscosity | Chlorine content, percent by weight | Nitrogen content, percent by weight |
| A | 0.10 | 0.850 | 1:4 | 6×10⁻³ | 0.15 | 9 minutes in one reactor | 0.60 | 1.70 | 0.04 | 0.05 |
| B | 0.10 | 0.500 | 1:4 | 3×10⁻³ | 0.09 | 16 minutes in one reactor | 0.85 | 1.43 | 0.04 | 0.05 |
| C | 0.15 | 0.750 | 1:4 | 11×10⁻³ | 0.1 | 9 minutes in three reactors (27 minutes in all). | 0.95 | 1.70 | 0.05 | 0.04 |
| D | 0.10 | 0.500 | 1:4 | 7×10⁻³ | 0.1 | 19 minutes in one reactor | 0.86 | 1.60 | 0.03 | 0.03 |

Example III

The method according to the present invention is compared with a previously known method by which a reaction mixture is brought into contact with air in a reaction vessel provided with a stirrer.

Under otherwise equal conditions two equal amounts of reaction mixture (each containing 1 kg. of 2,6-dimethylphenol) are brought, respectively, into a reaction vessel having a diameter of 0.45 m. provided with a stirrer and an air inlet and into a column of the type referred to in the accompanying figure by the numeral 1 and having a diameter of 10 cm. and a length of 3.75 m.

The amount of air passed therethrough is expressed in liters per kg. monomer (2,6-dimethylphenol) per minute. This amount is referred to as specific gas rate. The corresponding superficial velocity in m./sec. is also shown in the table.

The reaction conditions and the results of these comparative experiments are shown in the following Table II:

TABLE II

| Run | Concentration 2,6-dimethylphenol in toluene, percent | CuCl, mole percent, calculated on monomer | Dimethyl-lauryl-amine, mole percent, calculated on monomer | Temp., °C. | Relative viscosity | 45 cm. Dia. Reactor with stirrer | | | | | 10 cm. Dia. Reactor shown in the figure | | | | |
|---|---|---|---|---|---|---|---|---|---|---|---|---|---|---|---|
| | | | | | | Specific gas rate | Superficial velocity, m./sec. | Reaction time in min. | Cl content, percent | N content, percent | Specific gas rate | Superficial velocity, m./sec. | Reaction time in min. | Cl content, percent | N content, percent |
| E | 10.9 | 4 | 8 | 38 | 1.40 | 53 | 0.0055 | 120 | 0.17 | 0.10 | 110 | 0.23 | 53 | 0.05 | 0.05 |
| F | 10.9 | 4 | 8 | 38 | 1.80 | 63 | 0.0066 | 120 | 0.14 | 0.11 | 140 | 0.30 | 60 | 0.06 | 0.04 |
| G | 10.9 | 4 | 8 | 38 | 1.96 | 67 | 0.0070 | 120 | 0.16 | 0.12 | 200 | 0.42 | 67 | 0.03 | 0.06 |
| H | 10.9 | 4 | 8 | 38 | 1.50 | 56 | 0.0058 | 120 | 0.14 | 0.11 | 250 | 0.53 | 56 | 0.04 | 0.03 |
| I | 10.0 | 4 | 12 | 38 | 1.44 | 120 | 0.0125 | 54 | 0.17 | 0.10 | 300 | 0.64 | 25 | 0.07 | 0.04 |
| J | 10.0 | 4 | 12 | 40 | 1.55 | 120 | 0.0125 | 57 | 0.17 | 0.09 | 300 | 0.64 | 25 | 0.04 | 0.06 |
| K | 10.0 | 4 | 12 | 37 | 1.51 | 120 | 0.0125 | 56 | 0.19 | 0.12 | 300 | 0.64 | 25 | 0.05 | 0.04 |

These comparative experiments clearly show that the products obtained by the method according to the present invention contain considerably lower percentages of nitrogen and chlorine than the products prepared in a conventional way.

Example IV

The reaction is carried out discontinuously in a tubular reactor referred to by the numeral 1 in the accompanying figure. The reactor is 10 cm. in diameter and 3.75 m. in length. It is filled to a level about one third of its height with a mixture of 1 kg. ortho-cresol; 8.8 kg. dry toluene; 200 g. dimethyllaurylamine; and 40 g. cuprous chloride. At a temperature of 40° C. air is passed through at a rate of 12 m.³/hour, corresponding to a superficial velocity of about 0.42 m./sec. After 90 minutes the air stream is stopped and the catalyst is killed by the addition of 400 ml. of 80% acetic acid. The polymer formed is precipitated with methanol, filtered off, washed with methanol and dried to constant weight at 90° C. in vacuo. A polymer insoluble in benzene is obtained in an amount of 750 g.

Example V

A reaction mixture consisting of 500 g. ortho-cresol, 500 g. 2,6-dimethylphenol, 200 g. dimethyllaurylamine, 40 g. cuprous chloride and 8.8 kg. dry toluene are treated in the manner of Example IV.

A polymer having a relative viscosity of 1.11 is obtained in an amount of 820 g.

EXAMPLE VI

A copolymer is prepared in the manner of Example V, except that instead of 500 g. ortho-cresol use is made of 500 g. ortho-chlorophenol. A copolymer having a relative viscosity of 1.16 is obtained in an amount of 600 g.

EXAMPLE VII

A copolymer is prepared in the manner of Example V, except that instead of 500 g. ortho-cresol use is made of 500 g. phenol.

A copolymer is obtained having a relative viscosity of 1.08 in an amount of 580 g.

EXAMPLE VIII

A copolymer is prepared in the manner of Example V, except that instead of 500 g. ortho-cresol use is made of 500 g. ortho-methoxy phenol.

A copolymer insoluble in benzene is obtained in an amount of 700 g.

While specific examples of preferred methods embodying the present invention have been set forth above, it will be understood that many changes and modifications may be made in the methods of procedure without departing from the spirit of the invention. It will therefore be understood that the examples cited and the particular proportions and methods of operation set forth above are intended to be illustrative only, and are not intended to limit the scope of the invention.

What is claimed is:
1. In a method for the oxidative polymerization of phenols to reaction products containing considerably smaller amounts of impurities by passing an oxygen-containing gas through a solution of the phenol to be polymerized, which solution also contains an oxidation catalyst, the improvement wherein the reaction is carried out by introducing into the bottom of a vertical column containing the reaction mixture a stream of the oxygen-containing gas having a superficial velocity, as defined herein, of at least about 0.15 meter/second.

2. A method according to claim 1, wherein the superficial velocity is within the range of about 0.4 to 0.8 meter/second.

3. A method according to claim 1, wherein the reaction is carried out continuously by continuously feeding liquid to and continuously discharging liquid from the column.

4. A method according to claim 3, wherein the supply of fresh reaction mixture to the liquid column takes place at the bottom thereof, and the discharge of liquid therefrom at the top.

References Cited

UNITED STATES PATENTS 3,306,874  2/1967  Hay _____ 260—47

OTHER REFERENCES

Holland, Chem. Eng. 70(8), 145–152 (Apr. 15, 1963) (pages 147, 148, 152).

Groggins, Unit Processes in Organic Synthesis, New York, McGraw-Hill, 1958 (pages 512–515).

Kramers et al., Elements of Chemical Reactor Design and Operation, New York, Academic Press Inc., 1963 (p. 20).

WILLIAM H. SHORT, *Primary Examiner.*

M. GOLDSTEIN, *Assistant Examiner.*